(12) United States Patent
Markfort

(10) Patent No.: US 10,343,709 B2
(45) Date of Patent: Jul. 9, 2019

(54) RESTORING TORQUE GENERATING DEVICES

(71) Applicant: TAKATA AG, Aschaffenburg (DE)

(72) Inventor: Dieter Markfort, Berlin (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 119 days.

(21) Appl. No.: 15/525,028

(22) PCT Filed: Nov. 2, 2015

(86) PCT No.: PCT/EP2015/075428
§ 371 (c)(1),
(2) Date: May 5, 2017

(87) PCT Pub. No.: WO2016/071270
PCT Pub. Date: May 12, 2016

(65) Prior Publication Data
US 2018/0229759 A1    Aug. 16, 2018

(30) Foreign Application Priority Data

Nov. 7, 2014 (DE) .......................... 10 2014 222 805

(51) Int. Cl.
*B62D 5/00* (2006.01)
(52) U.S. Cl.
CPC .................... *B62D 5/005* (2013.01)
(58) Field of Classification Search
CPC ...................................................... B62D 5/005
USPC ......................................................... 180/400
See application file for complete search history.

(56) References Cited

U.S. PATENT DOCUMENTS

2017/0158222 A1* 6/2017 Schulz ................. B62D 1/04

FOREIGN PATENT DOCUMENTS

| DE | 101 59 330 A1 | 7/2002 | |
|---|---|---|---|
| DE | 10159330 A1 * | 7/2002 | ............. B62D 5/005 |
| GB | 815443 A * | 6/1959 | ............. B60W 10/06 |

OTHER PUBLICATIONS

International Search Report dated Feb. 11, 2016 issued in PCT/EP2015/075428.

* cited by examiner

*Primary Examiner* — Tony H Winner
*Assistant Examiner* — Felicia L. Brittman
(74) *Attorney, Agent, or Firm* — Gordon Rees Scully Mansukhani, LLP

(57) ABSTRACT

A restoring torque generating device for generating a restoring torque acting on a steering handle of a vehicle comprising a first spring unit for generating a first restoring torque, a second spring unit for generating a second restoring torque, a driver cooperating with the first and the second spring unit. The driver can be coupled with a steering shaft of the vehicle such that during a rotation of the steering shaft in a first direction of rotation it acts on the first spring unit and during a rotation of the steering shaft in an opposite, second direction of rotation it acts on the second spring unit.

15 Claims, 3 Drawing Sheets

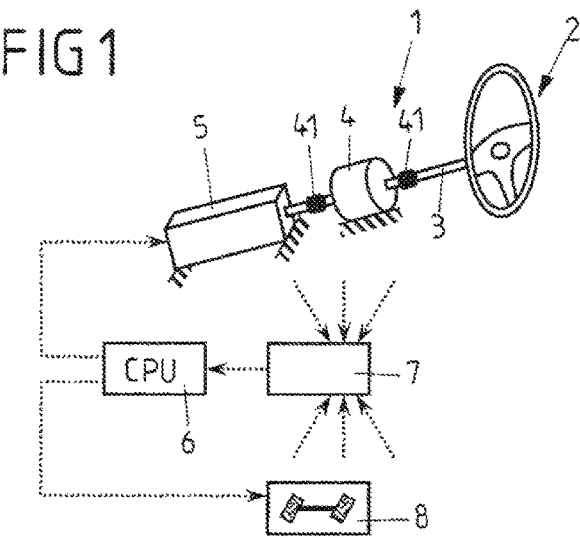
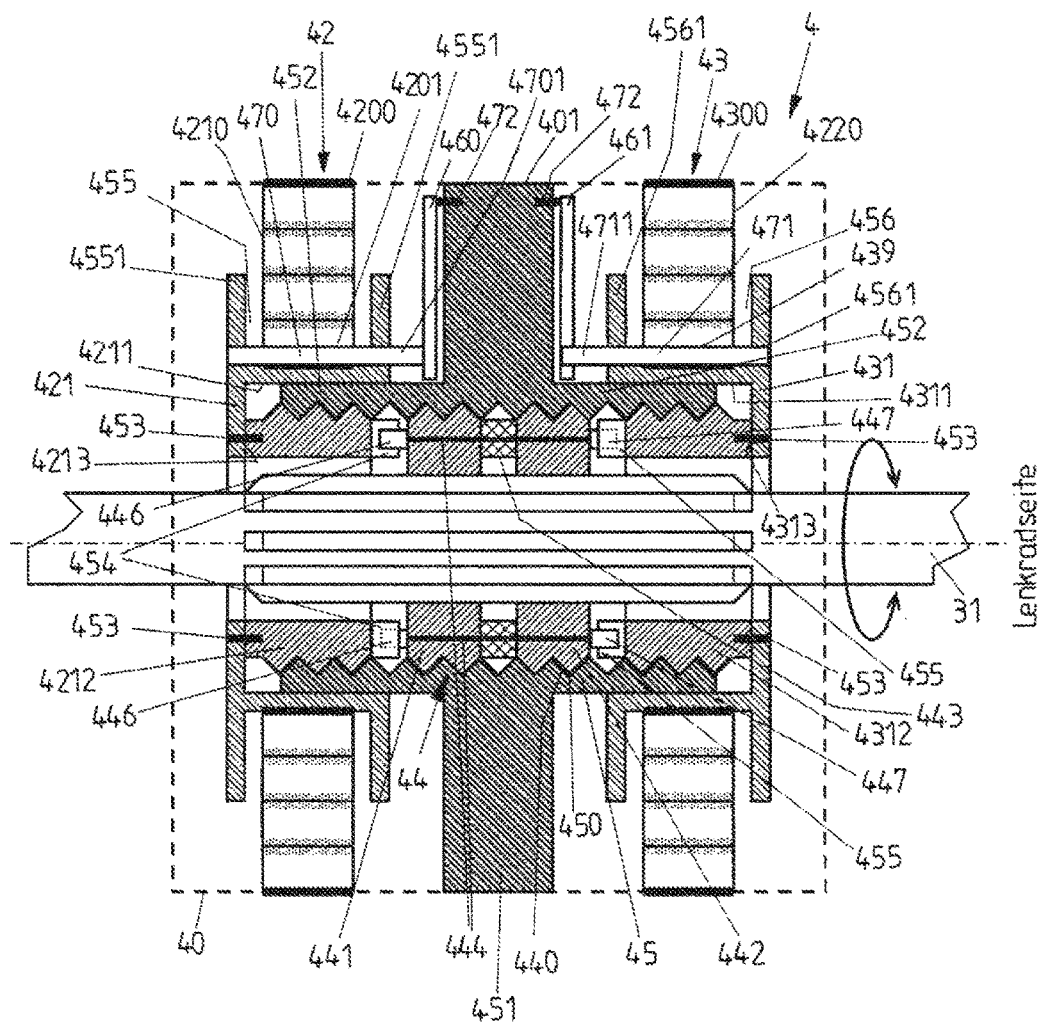

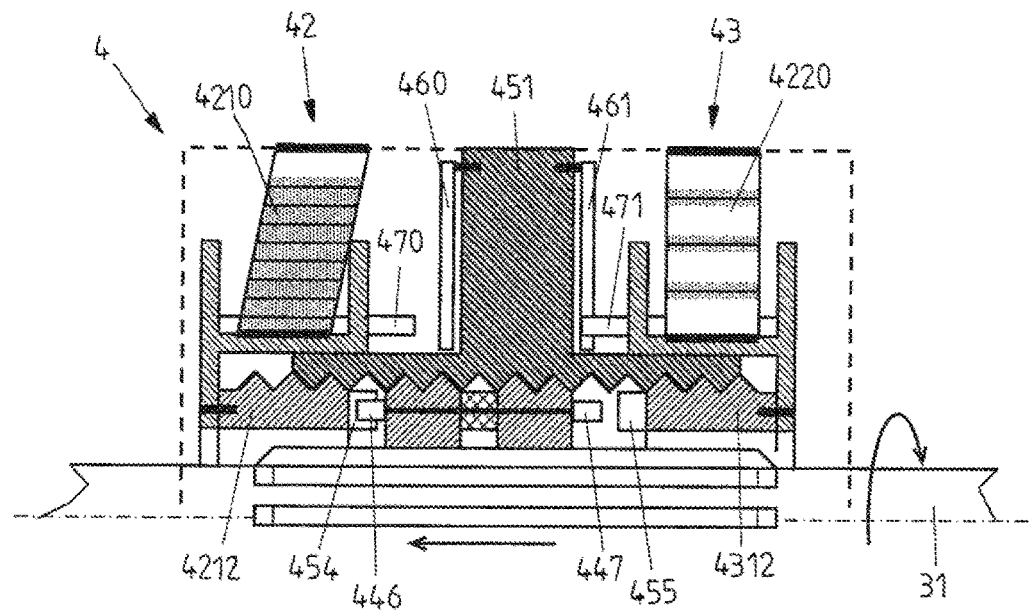
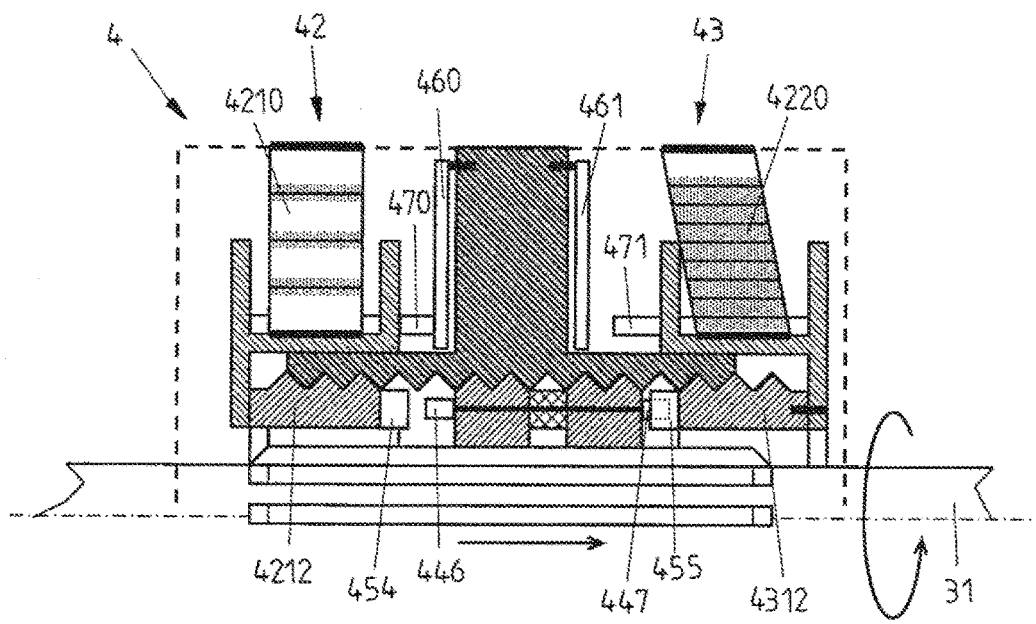

RESTORING TORQUE GENERATING DEVICES

CROSS-REFERENCE TO A RELATED APPLICATION

This application is a National Phase Patent Application of International Patent Application Number PCT/EP2015/075428, filed on Nov. 2, 2015, which claims priority of German Patent Application Number 10 2014 222 805.0, filed on Nov. 7, 2014.

BACKGROUND

The invention relates to restoring torque generating devices for generating a restoring torque acting on a steering handle of a vehicle.

Such restoring torque generating devices in particular are used in steer-by-wire steering systems, in order to generate a restoring torque which counteracts a torque generated by a vehicle operator via the steering handle. The generation of such restoring torque is required, as in steer-by-wire steering systems the steering handle and the vehicle wheels are mechanically decoupled from each other and a desired steering angle entered by the vehicle operator via the steering handle is exclusively electrically transmitted to positioning units/actuators for steering the vehicle wheels, so that forces acting on the wheels during a steering movement are not passed on to the steering handle.

To nevertheless provide the driver with a driving feel similar to a conventional steering system, e.g. electronically actuated actuators (for example in the form of an electric motor) are used for generating a restoring torque. In addition, a purely mechanical generation of a restoring torque can be effected. In particular, there is used a combination of an electric actuator and a mechanical restoring torque generating device, wherein for the case of a defect (for example in the case of a failure of the vehicle electronics or in case the electric actuator no longer is actuatable for other reasons) the mechanical restoring torque generating device provides a fallback level.

Another aspect for the use of additional mechanical restoring torque generating devices is the relief of the electronically actuated actuator, so that the operation of the actuator can be effected with lower power.

A mechanical restoring torque generating device is described for example in DE 101 59 330 A1. There is disclosed a reaction torque simulator which for generating a restoring torque comprises two spiral springs which are loaded or unloaded depending on the direction of rotation of a steering shaft. Tensioning of the spiral springs is effected via a driver, wherein the construction however merely allows tensioning of the spring over an angular range of less than 360°. For this reason a transmission is located between the spiral springs and the steering shaft, via which a rotation of the steering shaft is transmitted to the driver.

The integration of a transmission in the steering wheel region however requires measures for damping noises and vibrations. Another disadvantage of the transmission can consist in that (as seen from the spiral springs) a small angle of rotation must be translated into a higher angle of rotation at the steering handle. As the transmitted angle of rotation is inversely proportional to the rotational speed, this means that for generating high restoring torques the spiral springs must be dimensioned correspondingly; in particular, the spiral springs must have a correspondingly high spring constant.

SUMMARY

It is the object of the invention to create a mechanical restoring torque generating device for a steering device, which is as comfortable as possible in operation and can be manufactured as cost-effectively as possible.

This object is solved by the restoring torque generating device with features as described herein.

Accordingly, there is provided a restoring torque generating device for generating a restoring torque acting on a steering handle of a vehicle, comprising
  a first spring unit for generating a first restoring torque,
  a second spring unit for generating a second restoring torque,
  a driver cooperating with the first and the second spring unit,
  wherein the driver can be coupled with a steering shaft of the vehicle such that during a rotation of the steering shaft in a first direction of rotation it acts on the first spring unit and during a rotation of the steering shaft in an opposite, second direction of rotation it acts on the second spring unit, wherein
  the restoring torque generating device is formed such that proceeding from a zero position the driver is decoupled from the second spring unit during a rotation of the steering shaft in the first direction of rotation and is decoupled from the first spring unit during a rotation in the second direction of rotation in such a way that in each case it is rotatable by angles of rotation which are greater than 360°.

Accordingly, the restoring torque generating device according to the invention need not include a transmission for transmitting a rotation of the steering shaft to the spring units, i.e. the steering shaft (or an output shaft coupled with the steering shaft and with the driver) and the driver acting on one of the spring units rotate about identical angles of rotation.

According to one aspect of the invention the restoring torque generating device is designed such that during a rotation of the steering shaft in the first direction of rotation the driver is decoupled from the second spring unit by an axial movement, and during a rotation in the second direction of rotation it is decoupled from the first spring unit by an axial movement. Hence, the driver can be coupled with the steering shaft such that it is linearly shiftable along the axis of the steering shaft, as will be explained in more detail below.

In particular—as seen in axial direction—the driver is arranged between the first and the second spring unit. For example, the driver is designed and arranged such that during a rotation of the steering shaft in the first direction of rotation it moves axially away from the second spring unit. Conversely, during a rotation of the steering shaft in the second direction of rotation the driver moves away from the first spring unit.

The driver for example includes at least one first coupling element which during a rotation of the steering shaft in the first direction of rotation gets in engagement with the first spring unit, and at least one second coupling element which during a rotation of the steering shaft in the second direction of rotation gets in engagement with the second spring unit, wherein the first and the second coupling element are arranged axially spaced from each other. It also is possible that the spring units each include a coupling structure cooperating with the coupling elements.

It also is conceivable that the first and the second coupling element each are formed as protrusion, wherein the two protrusions point in (in particular axially) opposite directions. In particular, the protrusions protrude from end faces of the driver facing away from each other, wherein the end faces each are facing one of the spring units.

The (in particular at least substantially cylindrical) driver also can be screwed into a holding element of the restoring torque generating device, for which purpose the driver in particular includes an external thread. During a rotation of the driver (during a rotation of the steering shaft) a linear movement of the driver along the axis of rotation at the same time is obtained via the screw connection. The holding element in turn can be fixed in a housing of the restoring torque generating device.

In addition, the restoring torque generating device according to the invention in particular includes an axle element to be coupled with the steering shaft (e.g. in the form of a spline shaft), which is positively connected with the driver such that the driver follows a rotation of the axle element. The axle element in particular permits the above-mentioned linear movement along the longitudinal axis of the axle element. Furthermore, the axle element is designed such that it can be coupled with a steering shaft of the vehicle.

According to a further aspect of the invention the restoring torque generating device comprises at least one further spring element (different from the first and the second spring unit) associated to the first or the second spring unit, by means of which a torque acting against the restoring torque of the associated spring unit can be generated.

The spring element for example is a bending spring. For generating the restoring torque, the first and/or the second spring unit for example include a spiral spring.

In a further aspect the invention relates to a restoring torque generating device for generating a restoring torque acting on a steering handle of a vehicle, in particular as described above, comprising
  a first spring unit for generating a first restoring torque,
  a second spring unit for generating a second restoring torque,
  a driver cooperating with the first and the second spring unit,
  wherein the driver can be coupled with the steering shaft of the vehicle such that during a rotation of the steering shaft in a first direction of rotation it acts on the first spring unit and during a rotation of the steering shaft in an opposite, second direction of rotation it acts on the second spring unit;
  at least two further spring elements, one of which is associated to the first and the other one to the second spring unit, and which each generate a torque which acts against the restoring torque generated by the associated spring unit, wherein
  the restoring torque generating device is formed such that proceeding from a zero position the first spring unit is decoupled from the associated further spring element during a rotation of the steering shaft in the first direction of rotation, and is decoupled from the associated further spring element during a rotation of the steering shaft in the second direction of rotation.

The restoring torque generating device according to this aspect of the invention, analogous to the first aspect of the invention, can be formed such that during a rotation of the steering shaft in the first direction of rotation the driver is decoupled from the second spring unit and during a rotation in the second direction of rotation it is decoupled from the first spring unit such that the driver in particular can each be rotated about angles of rotation which are greater than 360°. Such configuration of the driver however is not absolutely necessary in the second aspect of the invention.

Decoupling of the first spring unit from the associated further spring element or of the second spring unit from the associated further spring element for example is effected in that the first or the second spring unit moves axially away from the associated further spring element; in particular until the first or the second spring unit has an axial offset to the respective further spring element.

For example, the first spring unit comprises a first component couplable with the driver and the second spring unit comprises a second component couplable with the driver, wherein during a rotation against the first direction of rotation the first couplable component acts on the further spring element associated to the first spring unit, and during a rotation against the second direction of rotation the second couplable component acts on the further spring element associated to the second spring unit.

It is conceivable that the first and the second spring unit each include a driver element for acting on the respectively associated further spring element.

The further spring elements for example serve to attenuate a rotary movement generated by action of a relaxing spring of the first or second spring unit.

The invention also relates to a steering system (in particular a steer-by-wire steering system) for a motor vehicle with a restoring torque generating device as described above.

BRIEF DESCRIPTION OF THE DRAWINGS

The invention will subsequently be explained in detail by means of exemplary embodiments with reference to the Figures.

FIG. 1 shows a schematic overview of a steering system with a steering torque generating device according to the invention.

FIG. 2 shows a section through a restoring torque generating device according to an exemplary embodiment of the invention.

FIG. 5A shows a part of the restoring torque generating device of FIG. 2 in a section during a clockwise rotation of the steering shaft.

FIG. 5B shows the restoring torque generating device during an anti-clockwise rotation of the steering shaft.

DETAILED DESCRIPTION

Figure 3:
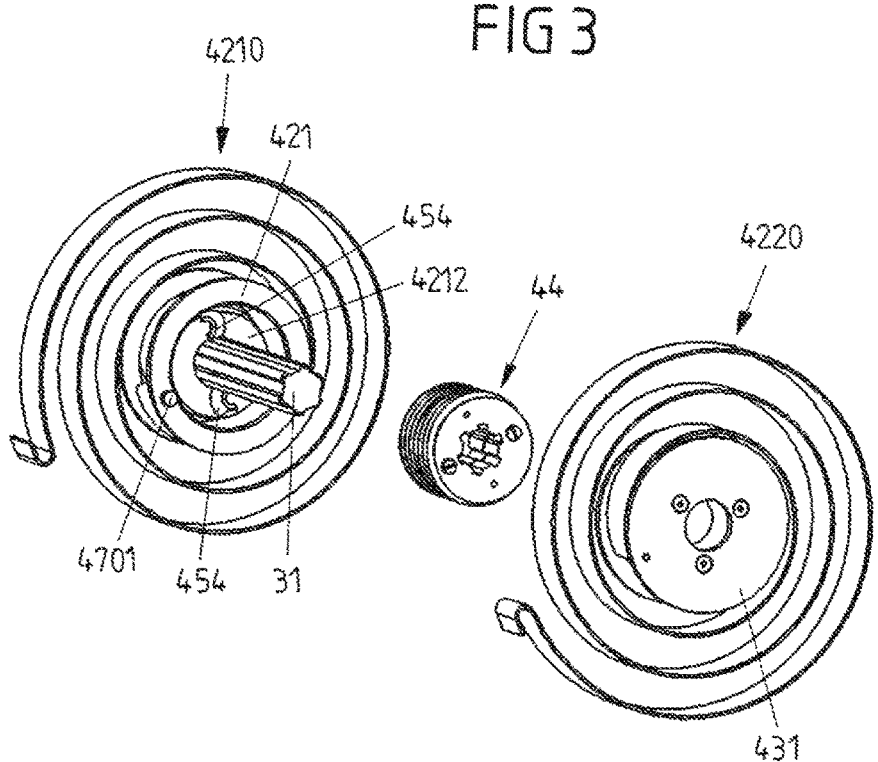
FIG. 3 shows a perspective representation of components of the restoring torque generating device of FIG. 2.

FIG. 1 shows an overview of a steer-by-wire steering system 1 of a vehicle with a steering handle in the form of a steering wheel 2 and a steering shaft 3 cooperating with the steering wheel 2. The steering shaft 3 in particular is arranged within a steering column (not shown). In addition, the steering system 1 comprises a mechanical restoring torque generating device 4 ("feedback unit") according to the invention as well as an electrically operated actuator in the form of an electric motor 5 ("feedback actuator") for generating a restoring torque on the steering wheel 2.

The restoring torque generating device 4 and the electric motor 5 are arranged in a vehicle-fixed manner and can be an integral part of the steering column. Furthermore, coupling elements 41 are indicated in FIG. 1, via which the restoring torque generating device 4 is connected with the electric motor 5 and with the steering shaft 3.

For actuating the electric motor 5 an electronic control system (CPU 6) is provided, wherein signals of a sensor system 7 are supplied to the CPU 6 and the control of the electric motor 5 is effected in dependence on the signals of the sensor system 7. These signals in particular include both detected states on the part of the steering system (e.g. steering wheel angle) and states which are to be allocated to a positioning unit 8 for steering the wheels of the vehicle (e.g. concerning the angular position of the wheels).

FIG. 2 shows a sectional representation of the restoring torque generating device 4 according to an exemplary embodiment of the invention, wherein the restoring torque generating device 4 here is in the neutral position (zero position). The steering wheel (not shown in FIG. 2) coupled with the restoring torque generating device 4 correspondingly is in the straight-ahead driving position and is held in this position by means of the spring systems of the restoring torque generating device 4 described below.

The restoring torque generating device 4 includes a first and a second spring unit in the form of a first and a second spring carrier system 42, 43 and a driver 44 cooperating with the spring carrier systems 42, 43.

Furthermore, the restoring torque generating device 4 comprises a centrally arranged axle element in the form of a spline shaft 31 which is coupled with a steering shaft (not shown in FIG. 2). The spline shaft 31 has a spline shaft profile via which the driver 44 is positively connected with the spline shaft 31. Correspondingly, the driver 44 follows a rotary movement of the spline shaft 31 (i.e. of the steering shaft). The clearance (the fit) between the spline profile of the spline shaft 31 and the spline profile of the driver 44 is designed such that the driver 44 is shiftable along the axial direction of the spline shaft 31.

On its outside the driver 44 is provided with a thread 440 via which it is screwed into an internal thread 450 of the threaded bushing 45. The threaded bushing 45 includes a flange 451 arranged centrally—as seen in axial direction—and extending vertically to the axis of the spline shaft 31, which is connected with a housing 40 of the restoring torque generating device 4 (in particular via an outer edge portion 401). The housing 40 and hence also the threaded bushing 45 is fixed to the vehicle.

The driver 44 (formed at least substantially rotationally symmetrically) includes a first and a second sub-element 441, 442, which are axially connected with each other via a washer 443. Via the thickness of the washer 443 clearance and friction can be adjusted in the threaded pairing of driver 44 and threaded bushing 45. For example, the washer 443 consists of an elastic material, which in particular provides for setting a desired pretension and hence a desired absence of clearance between the thread flanks of the driver 44 and the threaded bushing 45. The connection of the two sub-elements 441, 442 of the driver 44 is effected via axially extending connecting elements 444, which in particular reach through the washer 443 and extend offset to each other e.g. by 180° (with respect to the axis of the spline shaft 31). It is conceivable that the connecting elements 444 each also reach through the sub-elements 441, 442 and on their end faces each form a pin-like protrusion 446, 447 whose function will be described below.

The spring carrier systems 42, 43 are located on different sides of the flange 451 of the threaded bushing 45, wherein coming from the steering wheel side along the axis the first spring carrier system 42 is arranged behind the flange 451 and the second spring carrier system 43 is arranged before the flange 451.

In addition, the spring carrier systems 42, 43 each comprise a spring carrier housing 421, 431 which each includes a cylindrical cutout 4211, 4311 (circular in cross-section). Via the cutouts 4211, 4311 the spring carrier housings 421, 431 each are guided on a hollow cylindrical portion 452 of the threaded bushing 45. In the cylindrical cutout 4211, 4311 there is also each located a component in the form of a threaded ring 4212, 4312 couplable with the driver 44, which on its end face is firmly connected with the respective spring carrier housing 421, 431 (via connecting elements 453).

The threaded rings 4212, 4312 each have a thread on their outside, via which they and hence the spring carrier systems 42, 43 are screwed into the thread 450 extending into the portions 452 of the threaded bushing 45. For limiting the maximum possible screw-in depth of the threaded rings 4212, 4312 a thrust washer (spacer ring) not shown in FIG. 2 can each be provided between an inside 4213, 4313 of the cutouts 4211, 4311 and an end face of the threaded bushing 45 each facing the insides 4213, 4313. For example, for a better release of the screw connection of the threaded rings 4212, 4312 with the threaded bushing 45 the thrust washer is formed of a sliding material (e.g. PTFE). On the end face the threaded rings 4212, 4312 each are provided with two driving projections 454, 455 arranged offset to each other by 180°.

The spring carrier systems 42, 43 furthermore each comprise a spiral spring 4210, 4220, which springs are identically constructed, but arranged folded towards each other by 180° (cf. FIG. 3). The spiral springs 4210, 4220 each are arranged in receiving portions 455, 456 of the spring carrier housings 421, 431, wherein the receiving portions 455, 456 each are delimited by flange portions 4551, 4561 of the end faces of the spring carrier housings 421, 431.

The spiral springs 4210, 4220 each are fixed to the housing 40 in a vehicle-fixed manner via an outer end 4200, 4300, while an inner end 4201, 4301 of the spiral springs 4210, 4220 each is attached to the spring carrier housings 421, 431, so that the inner ends 4201, 4301 are rotatable together with the spring carrier housings 421, 431. The spiral springs 4210, 4220 consist of a metal strip wound up in one plane, which can be coated (on one side or on both sides) for damping noise or for suppressing natural vibrations.

Via first and second coupling elements in the form of the protrusions 446, 447 already mentioned above, which are formed as tabs of the connecting elements 444, the driver 44 can act on the threaded rings 4212, 4312 and hence on the spiral springs 4210, 4220. Protrusions separate from the connecting elements 44 can of course also be provided as coupling elements. The protrusions 446, 447 cooperate with the driving projections 454, 455 of the threaded rings 4212, 4312 likewise already mentioned above, wherein during a clockwise rotation (as seen from the steering shaft) of the spline shaft 31 (i.e. during a rotation of the steering shaft) the protrusions 446 of the first sub-element 441 of the driver 44 abut against the driving projections 454 of the threaded ring 4212 of the first (left) spring carrier system 42. The threaded ring 4212 thereby is rotated and the spiral spring 4210 of the first spring carrier system 42 is tensioned. During an anti-clockwise rotation of the spline shaft 31 the spiral spring 4220 of the second (right) spring carrier system 43 correspondingly is tensioned.

In addition, during a rotation of the spline shaft 31 the driver 44 moves in axial direction. During a clockwise rotation of the spline shaft 31 in the threaded bushing 45 the driver 44 thus is screwed away from the second (right) spring carrier system 43, namely at least until the protrusions 447 of the right sub-element 442 of the driver 44 are arranged axially spaced from the driving projections 455 of the threaded ring 4312 of the second spring carrier system 43, i.e. the protrusions 447 and the driving projections 455 no longer overlap. During a clockwise rotation the driver 44 thus decouples from the second spring carrier system 43, namely such that it (and hence the spline shaft 31 or the steering shaft 3) can be rotated about angles of rotation which are greater than 360°. Analogously, decoupling of the driver 44 from the first spring carrier system 43 is effected during an anti-clockwise rotation of the spline shaft 31. Such decoupling of the driver 44 provides for tensioning of the spiral springs 4210, 4220 even if the spline shaft 31 is rotated by more than one revolution, without a transmission having to be provided between the spline shaft 31 and the spiral springs 4210, 4220.

In addition to the spiral springs 4210, 4220 of the spring carrier systems 42, 43 the restoring torque generating device 4 includes two more spring elements in the form of two bending springs 460, 461. The spring carrier systems 42, 43 form a first spring system of the restoring torque generating device 4, while the bending springs 460, 461 form a second spring system.

An action on the bending springs 460, 461 each is effected via an end 4701, 4711 of a fastening element in the form of a pin 470, 471, via which the inner end 4201, 4301 of the spiral springs 4210, 4220 each is fixed to the spring carrier housings 421, 431. It is of course also conceivable that for acting on the bending springs 460, 461 elements separate from the pins 470, 471 are provided. The bending springs 460, 461 are arranged relative to the pins 470, 471 such that during a clockwise rotation of the threaded rings 4212, 4312 and hence of the spring carrier housings 421, 431 only the pin 471 of the second (right) spring carrier system 43 abuts against the associated right bending spring 461 and thus acts on the same. In this way, a rotation of the second (right) spring carrier system 43 can dampingly be stopped by action of the relaxing spiral spring 4220. Conversely, during an anti-clockwise rotation of the threaded rings 4212, 4312 only the pin 470 of the first (left) spring carrier system 42 abuts against the associated left bending spring 460. The ends of the bending springs 460, 461 each facing away from the pins 470, 471 are fixed to an outer edge region of the flange 451 of the threaded bushing 45 via fastening elements 472.

Figure 4:
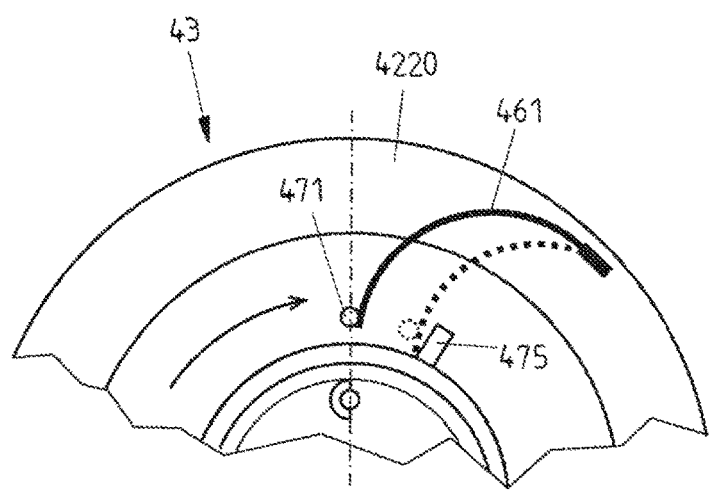
FIG. 4 shows an enlarged representation of a part of the restoring torque generating device of FIG. 2.

A portion of the restoring torque generating device 4 with the bending spring 461 on the right in FIG. 2 is shown on an enlarged scale in FIG. 4 (as seen from the steering wheel side). In the neutral position (i.e. a steering handle coupled with the restoring torque generating device 4 via the steering shaft and the spline shaft is in the straight-ahead driving position) the two spiral springs 4210, 4220 of the spring carrier systems 42, 43, which in particular have at least approximately identical spring characteristics, are pretensioned with respect to the driver 44 and therefore exert a torque on the driver 44 via the spring carrier housings 421, 431 and the threaded rings 4212, 4312 connected with the same. This becomes possible due to the fact that in the neutral position the driving projections 454, 455 of the threaded rings 4212, 4312 overlap with the associated pin-like protrusions 446, 447 of the driver 44 (as seen in axial direction of the spline shaft 31), i.e. are in contact with each other. The torque of the spiral spring 4210 of the first spring carrier system 42 acts in anti-clockwise direction, while the torque of the spiral spring 4220 of the second spring carrier system 43 acts in clockwise direction (direction of arrow).

The two bending springs 460, 461, which likewise can have at least approximately identical spring characteristics, also are pretensioned in the neutral position, wherein the torque exerted on the respectively associated spring carrier system 42, 43 via the pins 470, 471 is directed against the torque of the respective spiral spring 4210, 4220, i.e. the torque of the bending spring 460 acts in clockwise direction, while the torque of the bending spring 461 is directed in anti-clockwise direction. In the neutral position of the restoring torque generating device 4 a torque equilibrium is obtained between the spiral springs 4210, 4220 on the one hand and the bending springs 460, 461 on the other hand. This position of the restoring torque generating device 4 defines the straight-ahead driving position of the steering wheel. The bend of the bending springs 460, 461 each can be limited by a stop 475 of the flange 451 of the threaded bushing 45.

The mode of operation of the restoring torque generating device 4 will further be explained with reference to FIGS. 5A and 5B, wherein FIG. 5A shows a half-section of the restoring torque generating device 4 after initiation of a steering movement to the right in clockwise direction (as seen from the steering wheel side). FIG. 5B shows the restoring torque generating device 4 during an anti-clockwise steering movement.

Via the spline shaft 31 the steering movement is transmitted to the driver 44, the same is screwed into the threaded bushing 45 in axial direction away from the steering wheel (direction of arrow) and thus shifted along the spline shaft 31 (along its spline profile). Along with the driver 44 its pin-like protrusions 446, 447 also are rotated in clockwise direction. If before initiation of the steering movement the steering wheel was not in the straight-ahead driving position, a clockwise rotation of the right threaded ring 4312 and hence a readjustment of the second spring carrier system 43 occurs due to the fact that the acting torque of the spiral spring 4220 of the second spring carrier system 43 exceeds the torque of the associated bending spring 461. However, this merely occurs until the bending spring 461 (or its free end) has been moved by the pin 471 from its starting position into the end position (dashed position in FIG. 4) by undergoing a further deformation. The end position is defined by the stop 475 at the flange 451 of the threaded bushing 45, which limits the swivel movement of the bending spring 461.

When the end position of the bending spring 461 is reached, the readjusting movement of the second spring carrier system 43 is stopped, while the driver 44 is screwed further within the threaded bushing 45 and on the spline profile of the spline shaft 31 is shifted away from the steering wheel. On the steering wheel side, the axial overlap of the driving projections 455 of the right threaded ring 4312 of the second spring carrier system 43 with the associated pin-like protrusions 447 of the driver 44 thereby is eliminated.

On the side facing away from the steering wheel, on the other hand, the overlap of the coupling elements, i.e. the protrusions 446 of the driver 44 and the driving projections 454 of the left threaded ring 4212, is maintained. By means of the protrusions 446 the rotary movement of the driver 44 thus is transmitted to the first spring carrier system 42, which due to its rotary movement screws in the threaded bushing 45 in axial direction away from the steering wheel (direction of arrow). Due to the rotary movement of the threaded ring 4212 the associated spiral spring 4210 of the first spring carrier system 42 also is tensioned further. At the same time the distance between the spring carrier system 42 and the flange 451 of the threaded bushing 45 is increased and the contact (the overlap) between the pin 470 and the free end of the bending spring 460 is eliminated. Upon elimination of this contact the torque acting on the steering wheel solely is dependent on the spring characteristic of the spiral spring 4210 of the first spring carrier system 42.

The movement of the spring carrier systems 42, 43 in axial direction and hence the maximum possible steering angle of the steering wheel for example can be limited by stops for the axially moving parts. Another possibility consists in exerting an influence via the thickness of the coating of the metal strip of the spiral springs 4210, 4220. By increasing the layer thickness the windings more likely will abut and the roll-up angle is reduced.

According to FIG. 5B, proceeding from the state as shown in FIG. 5A, the first spring carrier system 43 has again been moved in direction of the steering wheel by action of the relaxing spiral spring 4210, until the pin 470 again gets in contact with the free end of the bending spring 460 and the restoring torque generating device 4 has taken the neutral position as shown in FIG. 2.

During a further anti-clockwise rotation of the steering wheel the above explanations made with respect to FIG. 5A apply analogously. First of all, the first spring carrier system 42 is stopped (due to the fact that the bending spring 460 abuts against a stop associated to it). As the coupling between the first spring carrier system 42 and the driver 44 gets lost when passing over the neutral position, merely the second spring carrier system 43 rotates with the driver 44, so that only the spiral spring 4220 is tensioned. The restoring torque acting on the steering wheel thus only is determined by the spring characteristic of the spiral spring 4220.

LIST OF REFERENCE NUMERALS

1 steering system
2 steering wheel
3 steering shaft
4 restoring torque generating device
5 electric motor
6 CPU
7 sensor system
8 positioning unit
31 spline shaft
40 housing
41 coupling element
42 first spring carrier system
43 second spring carrier system
44 driver
45 threaded bushing
401 edge portion
421, 431 spring carrier housing
441, 442 sub-element
443 washer
444 connecting element
446, 447 protrusion
450 thread
451 flange
452 portion of threaded bushing
453 connecting elements
454, 455 driving projection
455, 456 receiving portion
460, 461 bending spring
470, 471 pin
472 fixing element
4200, 4300 outer end of spiral spring

4201, 4301 inner end of spiral spring
4211, 4311 cutout
4212, 4312 threaded ring
4213, 4313 inside
4551, 4561 flange portion
4701, 4711 end of pin

The invention claimed is:

1. A restoring torque generating device for generating a restoring torque acting on a steering handle of a vehicle, comprising:
a first spring unit for generating a first restoring torque,
a second spring unit for generating a second restoring torque,
a driver cooperating with the first and the second spring units,
wherein the driver can be coupled with a steering shaft of the vehicle such that during a rotation of the steering shaft in a first direction of rotation it acts on the first spring unit and during a rotation of the steering shaft in an opposite, second direction of rotation it acts on the second spring unit,
wherein the restoring torque generating device is formed such that proceeding from a zero position the driver is decoupled from the second spring unit during a rotation of the steering shaft in the first direction of rotation and is decoupled from the first spring unit during a rotation in the second direction of rotation in such a way that in each case it is rotatable by angles of rotation which are greater than 360°.

2. The restoring torque generating device according to claim 1, wherein during a rotation of the steering shaft in the first direction of rotation the driver is decoupled from the second spring unit by an axial movement and during a rotation in the second direction of rotation it is decoupled from the first spring unit by an axial movement.

3. The restoring torque generating device according to claim 1 wherein the driver is arranged between the first and the second spring unit as seen in the axial direction.

4. The restoring torque generating device according to claim 1, wherein the driver includes at least one first coupling element which during a rotation of the steering shaft in the first direction of rotation gets in engagement with the first spring unit, and at least one second coupling element which during a rotation of the steering shaft in the second direction of rotation gets in engagement with the second spring unit, wherein the first and the second coupling elements are arranged axially spaced from each other.

5. The restoring torque generating device according to claim 4, wherein the first and the second coupling elements each are formed as protrusions, wherein the two protrusions point in opposite directions.

6. The restoring torque generating device according to claim 1, wherein the driver is screwed into a holding element.

7. The restoring torque generating device according to claim 1, further comprising an axle element to be coupled with the steering shaft, which is positively connected with the driver such that the driver follows a rotation of the axle element.

8. The restoring torque generating device according to claim 7, wherein the driver is axially movable relative to the axle element.

9. The restoring torque generating device according to claim 1, further comprising at least one further spring element associated to the first or the second spring units, by means of which a torque acting against the restoring torque of the associated spring unit can be generated.

10. The restoring torque generating device according to claim 9, wherein the further spring element is a bending spring.

11. The restoring torque generating device according to claim 1, wherein the first and/or the second spring units include a spiral spring.

12. A steering system for a motor vehicle with a restoring torque generating device according to claim 1.

13. A restoring torque generating device for generating a restoring torque acting on a steering handle of a vehicle, comprising:
- a first spring unit for generating a first restoring torque,
- a second spring unit for generating a second restoring torque,
- a driver cooperating with the first and the second spring units,
- wherein the driver can be coupled with a steering shaft of the vehicle such that during a rotation of the steering shaft in a first direction of rotation it acts on the first spring unit and during a rotation of the steering shaft in an opposite, second direction of rotation it acts on the second spring unit;
- at least two further spring elements, one of which is associated to the first and the other one to the second spring unit, and which each generate a torque which acts against the restoring torque generated by the associated spring unit,
- wherein the restoring torque generating device is formed such that proceeding from a zero position the first spring unit decouples from the associated further spring element during a rotation of the steering shaft in the first direction of rotation, and
- during a rotation of the steering shaft in the second direction of rotation the second spring unit decouples from the further spring element associated to it.

14. The restoring torque generating device according to claim 13, wherein the first spring unit includes a first component couplable with the driver and the second spring unit includes a second component couplable with the driver, wherein during a rotation of the first couplable component against the first direction of rotation the first spring unit acts on the associated further spring element, and during a rotation of the second couplable component against the second direction of rotation the second spring unit acts on the associated further spring element.

15. The restoring torque generating device according to claim 14, wherein the first and the second spring units each include a driver element for acting on the respectively associated further spring element.

* * * * *